United States Patent [19]
Vaughan et al.

[11] Patent Number: 5,291,290
[45] Date of Patent: Mar. 1, 1994

[54] HIGH POWER BROADCAST TRANSMISSION SYSTEM WITH FERRITE CIRCULATOR

[75] Inventors: Thomas J. Vaughan, Rye Beach, N.H.; Erich Pivit, Allmersbach, Fed. Rep. of Germany

[73] Assignee: Pesa Micro Communications, Inc., Manchester, N.H.

[21] Appl. No.: 348,603

[22] Filed: May 8, 1989

[51] Int. Cl.[5] .............................................. H04N 5/38
[52] U.S. Cl. .................................. 348/723; 333/1.1; 455/103
[58] Field of Search ................... 333/1.1, 24.2; 370/24, 370/32, 37; 455/67, 103, 115, 67.1; 358/186

[56] References Cited

U.S. PATENT DOCUMENTS

| | | | |
|---|---|---|---|
| 3,276,019 | 9/1966 | Fackler | 455/103 X |
| 3,721,924 | 3/1973 | Berson et al. | 333/1.1 X |
| 4,240,155 | 12/1980 | Vaughan | 370/37 X |
| 4,430,619 | 2/1984 | Epsom et al. | 333/1.1 X |
| 4,710,733 | 12/1987 | Crill et al. | 333/1.1 X |
| 4,717,895 | 1/1988 | Pivit et al. | 333/1.1 |

*Primary Examiner*—Paul Gensler
*Attorney, Agent, or Firm*—Robert T. Dunn

[57] ABSTRACT

According to an embodiment of the present invention, a high power RF electric signal transmission system such as a TV broadcast system operating in the range of 100 kW at a UHF band includes one or more high power klystrons whose outputs are combined and fed to the first port of a high power Y-junction three port ferrite circulator, the second port of the circulator feeds the broadcast system radiating antenna system, the third port of the circulator feeds a non-reflecting RF load and means are provided for tuning the circulator to compensate for changes in the temperature of the circulator ferrite material, so that the klystron(s) are isolated from reflections from the antenna system. According to another embodiment, means are provided for selectively coupling the second port of the circulator to the radiating antenna system or to a station load whereby the RF power from the klystrons may be switched from the antenna system to the station load without reflected RF from such switching action flowing to the klystron(s).

The invention has particular application to a high power HDTV broadcast system due to the particular requirements of HDTV broadcasting, as more fully described herein.

17 Claims, 7 Drawing Sheets

HIGH POWER BROADCAST TRANSMISSION SYSTEM WITH FERRITE CIRCULATOR

BACKGROUND OF THE INVENTION

The present invention relates to high frequency VHF and UHF (herein referred to as RF), high power broadcast transmission systems, such as commercial television (TV) broadcast systems operating at over 100 kilowatts (kW) of forward power to the system radiating antenna; and more particularly to such a broadcast system including a special ferrite circulator device that protects the system RF power generators and meets other requirements of the system.

BROADCAST SYSTEMS

High power TV broadcast systems today have imposed many new requirements. For example 100% reliability is desired since stations are now on the air continually for twenty four hours a day almost every day of the week. Intervals available for maintenance and calibration are far less frequent and are shorter intervals than available in the past. The system must provide multiple RF paths between the RF generators and the radiating antenna, in case of transmitter failure; and switching from one path to another must be done with no loss of air time.

These requirements have been met in part with the development of special purpose microprocessor controlled computers that monitor the system and initiate control signals to actuate motor driven switches that switch between the available paths, turn RF generators (klystrons) off and on and feed unwanted reflections to non-reflective loads.

A broadcast system today must transmit more RF power than in the past. Broadcast systems having several RF power klystrons operating together are common, particularly in TV broadcast systems. For example, four 60 kW klystrons are used to produce an ERP (Effective Radiation Power) of five million watts. These multiple klystron systems raise the requirements for fast accurate detection of faults and corrective actions. More efficient components are required to reduce power losses and to minimize damage due to component failure.

New all band highly efficient klystrogs and MSDC (Multiple System Depressed Collect) klystrons require a more stable impedance. High definition television (HDTV) requires that the RF broadcast system be almost transparent, non-dispersive, be loss less, reflectionless and produce no cross modulation products. In HDTV systems reflections must be well below perceptible levels. For example, conditions for optimum performance of the HDTV RF system requires that:

The input impedance of the RF system should be exactly equal to the output impedance at all times and for all modes of operation.

The RF system should be completely transparent; e.g., there should be no degradation of the video signal. Reflections should be less than visible levels.

For maximum transfer of energy, the input impedance to the HDIV RF system must be equal to the output impedance of the generator (the klystrons). The input impedance of the RF system is dependent on the system loads. There are two different loads that are presented to the klystron as follows:

(a) Test and Calibration Mode—The system with the station load on the output where the impedance is static and relatively wide band.

(b) Operational Mode—The RF system with a long transmission line and antenna on the output where the impedance is different from the test and calibration mode and is dynamic and relatively narrow band.

The difference in pass band response is very dependent on the impedance change. For example, the pass band response is a relative flat response and may be ±0.5 dB into the station load, whereas the response may be ±4.0 dB with the antenna as a load. Prior art FIGS. 12 and 13 show scope traces that illustrate these responses.

The ripple amplitude and the frequency of the ripples are a function of the distance to the antenna and the antenna voltage standing wave ratio (VSWR). The power output of a klystron can vary by as much as 25% with a constant 1.15 VSWR changing phase.

An RF system can contain over two hundred frequency components. Due to the finite band width and large distance involved, it is possible for reflection to add in phase at some frequencies. For example, the antenna can be two thousand feet (1000 wavelengths long) from the klystron RF generator. In that case, the worst case reflection could be the sum of all the reflections in the system. In view of this, the components can not be just connected together, they must be complementary matched so that the impedance of two components will have a lower VSWR than either component alone. Furthermore, for stability, the electrical lengths between components must not change. In addition, sun loading (heating) on a two thousand foot transmission line will cause the line to expand two feet (one wavelength), changing the impedance balance between the antenna and the RF system.

Isolators:

Heretofore, ferrite circulators have been used in low power RF systems at power levels of a few kW to shunt unwanted reflections of RF power into attenuating loads. For this use, the Y-junction three port circulator is a well known device. The usual function of the device is to feed RF signals from a low power RF generator, entering a first of the three ports to a useful load connected to a second of the ports while none of that RF feeds to the third port. At the sametime, any of the RF that reflects from the useful load back into the circulator is fed only to the third port which may feed into the non-reflecting attenuating load. Thus, reflections from the useful load do not feed back into the RF generator.

This function of the circulator depends upon the ferrite material contained in the Y-junction. When the ferrite material is magnetized by an external magnet, it becomes resonant to electro-magnetic waves of a particular frequency and that resonance gives rise to the described non-reciprocal flow of signals through the junction that are at the resonant frequency. Usually, optimum performance of the circulator is achieved by magnetizing the ferrite to saturation magnetization, because saturation magnetization tends to realize the greatest isolation between two isolated ports, such as from the second to the first port in the above example, and the minimum insertion loss between two coupled ports, such as from the first to the second port in the above example.

The ferrite saturation magnetization is temperature dependent. A change in saturation magnetization can be compensated for by changing the external magnetic field and for that purpose the external magnetic field may be provided by a permanent magnet and an additional electro-magnet and so the magnetization can be changed as necessary by varying the current in the electro-magnet. In this way, a change in the temperature of the ferrite producing a change in the ferrite saturation magnetization can be compensated for to bring performance to optimum. When the saturation magnetization changes due to a temperature change, it is said that the circulator is destabilized or detuned and when compensation is made by changing the electro-magnet current, the circulator is said to be stabilized or tuned.

Stabilizing or tuning a circulator using an electro-magnet as part of the external magnetic field system requires a large electro-magnet in addition to a permanent magnet located outside of the Y-junction. This requirement increases the total size and weight of the circulator and is not a problem at low RF power (up to a few kW), because the ferrite does not heat up so much that tuning cannot be accomplished by changing the electro-magnet current. However, at high RF power, particularly over 100 kW, heating of the ferrite material is so great that the requirements of the tuning system cannot be met with a magnet system of practical size and weight.

SUMMARY OF THE INVENTION

It is an object of the present invention to provide high frequency VHF and UHF (herein referred to as RF), high power broadcast transmission systems, such as a commercial television broadcast system operating at over 100 killowatts (kW) of forward power to the system radiating antenna in which at least some of the above mentioned requirements are met.

It is another object of the present invention to provide a high power RF broadcast transmission systems, such as a commercial TV broadcast system operating at over 100 kW of forward power to the system radiating antenna having automatic passive means that protects the system RF power generators from reflected RF.

It is another object of the present invention to provide a high power RF broadcast transmission systems, such as a commercial TV broadcast system operating at over 100 kW of forward power to the system radiating antenna having a special ferrite circulator device that automatically protects the system RF power generators from reflected RF.

It is another object of the present invention to provide such a special ferrite circulator device in a high power RF broadcast transmission systems, such as a commercial TV broadcast system operating at over 100 kW of forward power to the system radiating antenna, wherein the ferrite material in the circulator is temperature stabilized.

According to an embodiment of the present invention, a high power RF electric signal transmission system such as a TV broadcast system producing over 100 kW at a UHF RF includes one or more high power klystrons whose outputs are combined and fed to the first port of a high power Y-junction three port ferrite circulator, the second port of the circulator feeds the broadcast system radiating antenna system, the third port of the circulator feeds a non-reflecting RF load and means are provided, for tuning the circulator to compensate for changes in the temperature of the circulator ferrite material, so that the klystron(s) are isolated from reflections from the antenna system.

According to another embodiment, means are provided for selectively coupling the second port of the circulator to the radiating antenna system or to a station load whereby the RF power from the klystrons may be switched from the antenna system to the station load without turning off the klystrons and without reflected RF from such switching action flowing to the klystron(s). This is called a "Hot Switch". The invention has particular application to a high power HDTV broadcast system due to the particular requirements of HDTV broadcasting, some of which are mentioned hereinabove.

The invention also has application in a multiplexer system, such as a high power FM multiplexer system for combining several FM channels feeding one antenna. It has application in diplexer systems such as diplexers that combine visual and aural frequencies and it has application to prevent intermode products generated in a klystron from being radiated.

These and other objects and features of the present invention are described more fully hereinbelow with reference to the drawings.

DESCRIPTION OF EMBODIMENTS OF THE INVENTION

Figure 1:
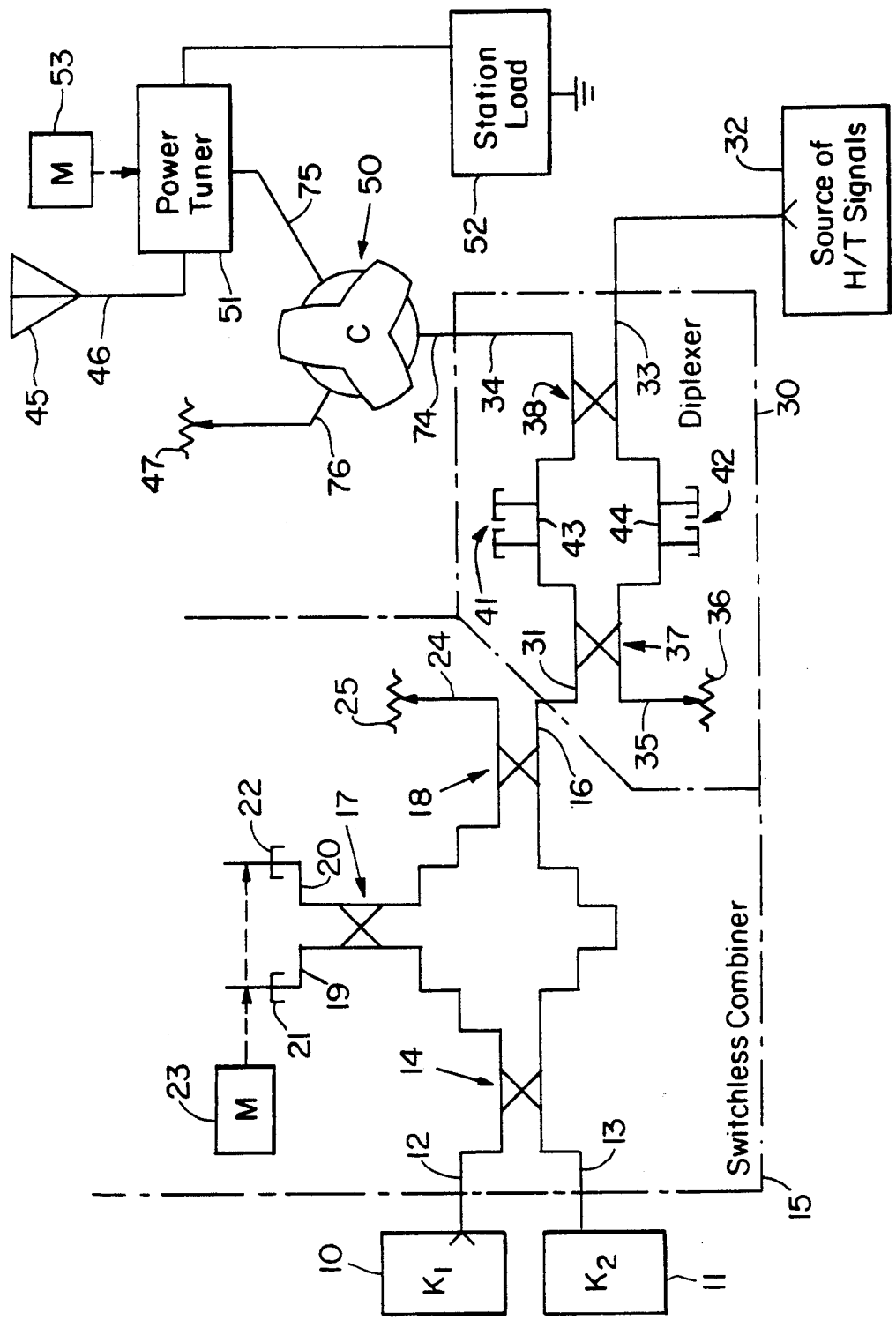
FIG. 1 is a schematic system diagram of a two klystron, high power (120 kW), TV or HDTV broadcast system operating at a UHF band, incorporating features of the present invention.

A schematic diagram of a 120 kW TV broadcast system operating at 651.240 MHz is shown in FIG. 1. This system is designed and the parts are specified through an optimization process. The optimization process consists of introducing conjugate matching or complementary resonant circuits. Components must be assembled as sub-assemblies, optimized, then connected as major sub-assemblies and re-optimized, until the complete system is optimized. The process is tedious, but ultimately the complete RF system will result in system VSWR over the band width of interest equal to or less than the individual component VSWR.

Figure 2:
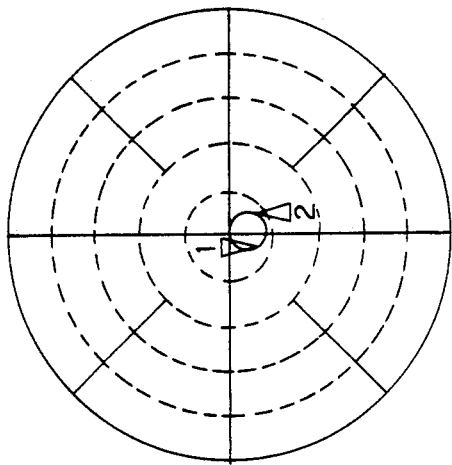
FIG. 2 is a Smith Chart for the system in FIG. 1 with the station load on the system output.
Figure 3:
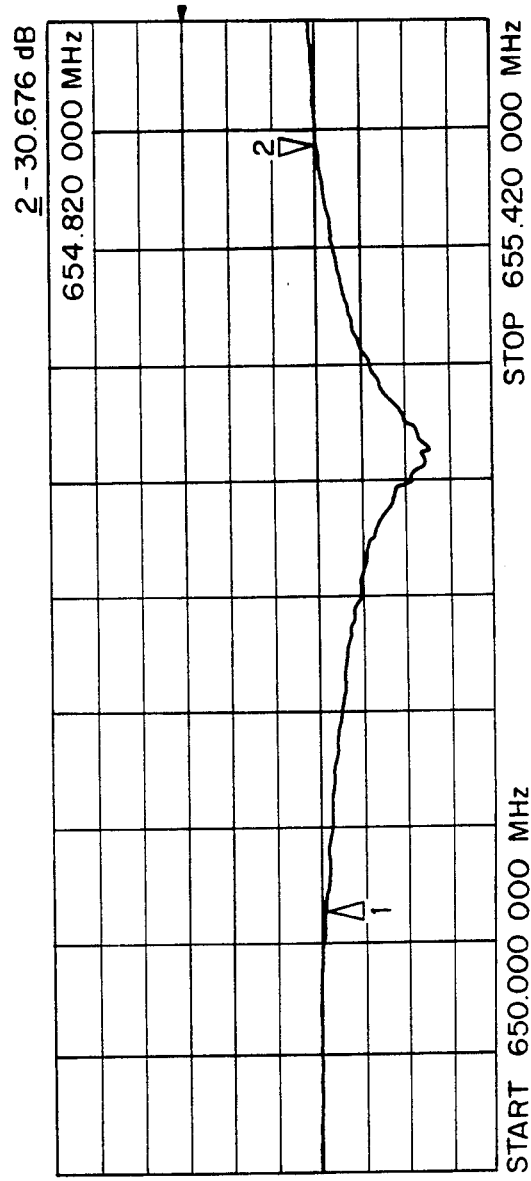
FIG. 3 is a correlation plot of the Smith Chart plot of FIG. 2.

With the station load 52 on the output of this system, the system looks into a relatively wide band static impedance. A Smith Chart for that operation is shown in FIG. 2. A correlation plot (VSWR and Return Loss) of the Smith Chart plot of FIG. 2 is shown in FIG. 3. These plots serve as a reference and show best case situation.

Figure 4:
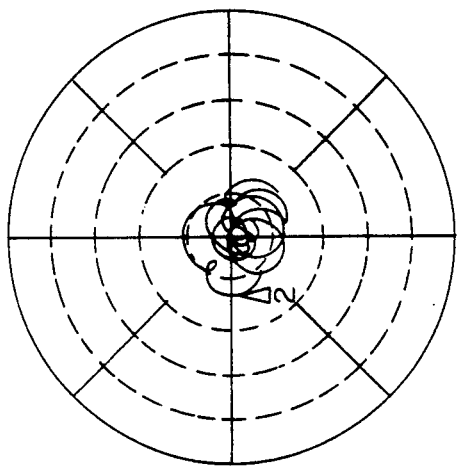
FIG. 4 is a Smith Chart plot of the same system with the transmission line and antenna as the load on the system output.
Figure 5:
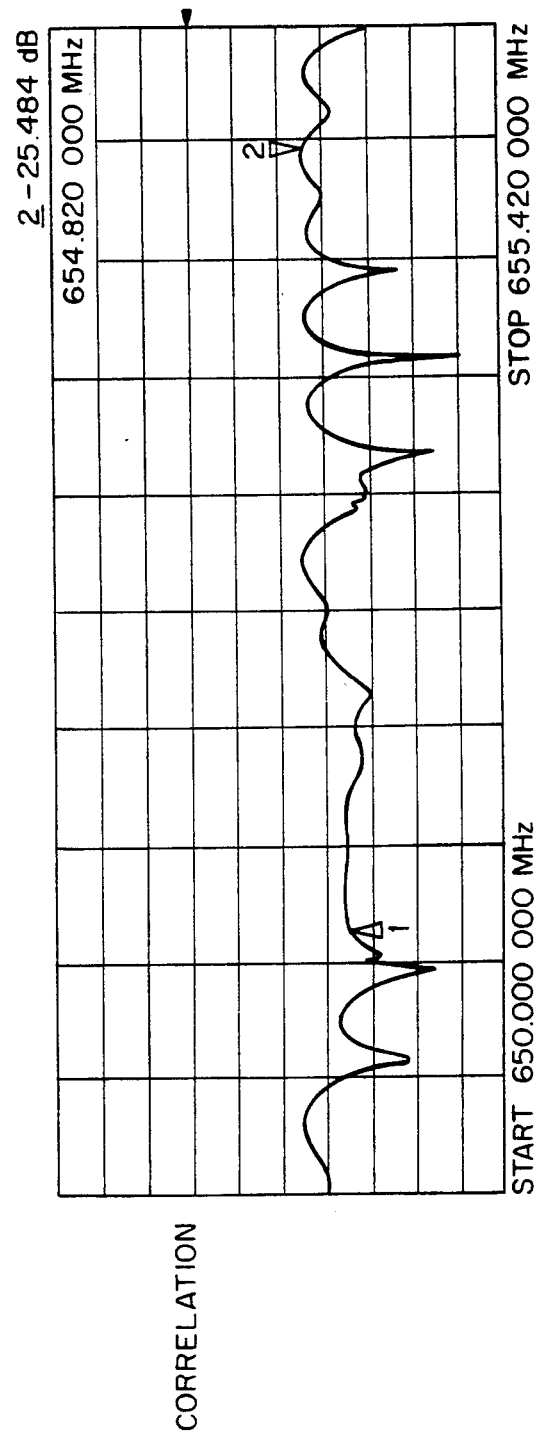
FIG. 5 is a correlation plot of the Smith Chart plot of FIG. 4.

A Smith Chart plot of the same system with the transmission line 46 and antenna 45 as the load is shown in FIG. 4. It reveals that the VSWR of the antenna will cause the impedance to change rapidly. The frequency change is one complete revolution of impedance. For a 2,000 foot installation, there would be 31 complete revolutions in a 6 MHz band. A correlation plot of this Smith Chart plot is shown in FIG. 5.

The impedance will also change due to daily thermal changes. Daily variation of temperature can result in the line on a 2,000 foot tower expanding one wavelength or 360°. The impedance of the complete system will rotate as a cluster about the center of a Smith Chart. This will result in power output changes that are much greater than the transmission loss due to VSWR variation. For example, a VSWR of 1.15 is a transmission loss of 0.5%, yet it can change the power output by 25%.

Group delay is the rate of change of phase with frequency. For most passive RF coaxial components, this will be zero. However, this is not so with waveguide, where the phase velocity is greater than the velocity of light. The resultant group delay is from two sources: the transmission line and high Q resonant circuits in the RF system. High Q circuits are in the diplexer 30 and are in a filterplexer (if included in the RF system). The variation due to a typical diplexer, such as diplexer 30 in FIG. 1, is 270 nanoseconds (ns) the variation due to a typical filterplexer is 120 ns, and the waveguide transmission line 46 is at least 30 ns across the visual TV band (NTSC TV) of 4.18 MHz. HDTV systems are very sensitive to group delay variation due to the additional carriers and side bands that are added.

Reflection from anywhere in the system will not only combine with other reflection to modify the impedance, but each individual reflection can cause a ghost. The ghost by definition is an exact reproduction of the original signal. Reflections displaced less than 250 ns are not normally a problem although they can cause edging effects. Reflections greater than 250 ns can result in visible distortion to the recovered picture. This can be seen at edges of either a while or black trailing images of each sharp transition in the picture. Reflections greater than 500 ns will appear as a separate image (ghost). When the number of lines are doubled as is proposed for HDTV, reflections greater than 250 ns will appear as a separate image.

The relationship between reflection delay in nanoseconds (ns) and the position and displacement of a ghost on a TV monitor is shown below.

| Distance Ft. | Delay ns | Displacement 25" monitor | |
|---|---|---|---|
| | | NTSC | HDTV |
| 125 | 250 | 0.09" | 0.19" |
| 250 | 500 | 0.18" | 0.38" |
| 500 | 1000 | 0.36" | 0.76" |
| 1000 | 2000 | 0.72" | 1.53" |
| 2000 | 4000 | 1.44" | 3.06" |

Most of the reflections within a transmitter room will be within 125 feet from the klystron and will not result in a ghost. It is generally agreed by those skilled in the art that reflections greater than 2% (VSWR=1.04) are visible by a critical observer.

The TV broadcast system shown in FIG. 1 includes two identical 60 kW klystrons 10 and 11 operated in synchronism producing total power of 120 kW and feeding directly into adjacent uncoupled ports 12 and 13 of four port directional coupler 14, which is the input coupler of switchless combiner 15. A switchless combiner is a passive combiner that combines the powers of the two klystrons without significant loss producing the total power of the two at the output port 16. The usual switchless combiner includes three, four port directional couplers as shown, the input coupler 14, balancing coupler 17 and output coupler 18. The two uncoupled output ports 19 and 20 of balancing coupler 17 terminate in variable line reflectors 21 and 22, respectively, which are positioned by motor 23. The other uncoupled output port 24 of output coupler 18 terminates in non-reflecting absorbing load 25. In operation, variable line reflectors 21 and 22 are adjusted together so that there is no net RF power reflected back into the klystrons and all Rf power from both klystrons flows in phase from output port 16.

Moving variable line reflectors 21 and 22 together causes the reflectors and balancing coupler 17 to act as a phase shifter causing the combined transmitter power to flow to diplexer 30 or to load 25. Further adjustment of line reflectors 21 and 22 causes the output of klystron 1 (10) to feed to load 25, while at the same time, the output of klystron 2 (11) is fed to output 16, which is the input of diplexer 30.

The total klystron RF power from port 16 is fed to diplexer 30 input port 31. Additional TV broadcast signals, herein called H/T signals from source 32, of a different frequency than the klystron RF, are fed to the other input port 33 of the diplexer. The purpose of diplexer 30 is to combine the total klystron RF output and the H/T signals in the diplexer output port 34 with little or no loss and no reflections back into switchless combiner 15. The other output port 35 of the diplexer terminates in non-reflecting load 36. The diplexer includes through signal (the klystron RF) four port directional coupler 37, injected signal (the H/T signals) four port directional coupler 38 and tuned circuits 41 and 42 in the lines 43 and 44, respectively, coupling the couplers. For construction and operation of such a diplexer, see U.S. Pat. No. 4,240,155, entitled "Diplexer and Miltiplexer" by Thomas J, Vaughan (who is an inventor herein), issued Dec. 16, 1980.

Figure 14:
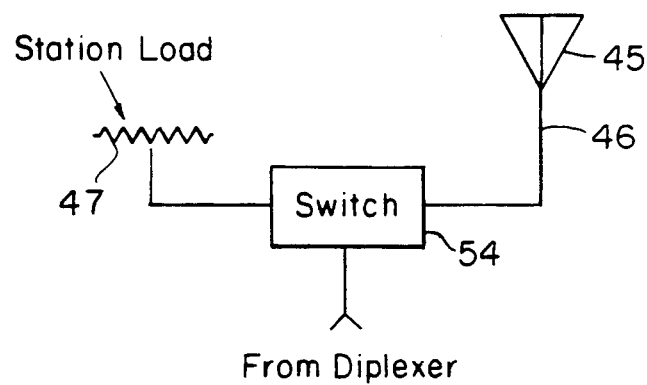
FIG. 14 shows part of a prior broadcast system in which the output of a diplexer (such as diplexer 30 in FIG. 1 in line 74) is coupled directly to the antenna line (such as line 46 in FIG. 1) via one or more RF switches so that the switch switches the combined RF from the diplexer to the antenna, or to the station test load.

In prior broadcast systems, as shown in FIG. 14, the output of diplexer port 34 is coupled directly to antenna line 46 via one or more RF switches, like switch 54. In that case, switch 54 serves to switch the combined signal output in line 74 from diplexer 30, from the antenna 45 to the station test load 47 and visa versa. Other switches could be used to bypass diplexer 30 and switch the combined power from combiner 15 (output port 16) directly to antenna line 46. In that case, the information signals may be combined at low power and amplified together in the system klystron. That technique is called multiplexing and is only done at high power in an emergency situation, due to the occurrance of non-linear activity of the klystron.

In FIG. 1, the broadcast antenna 45 may be on a tower and so the transmission line 46 to the antenna may be 2000 feet long as mentioned above, giving rise to all of the reflections, imbalances and other problems mentioned above. Many of those problems are reduced or eliminated by connecting a high power temperature stabilized, three port, Y-junction ferrite circulator 50 between diplexer output port 34 and the antenna transmission line 46. Such a circulator introduces negligible, or tolerable, loss and shunts substantially all reflected power from transmission line 46 into non-reflecting absorbing load 47.

Circulator 50 is a high power isolator that reduces or eliminates many of the problem that are now so significant in high power TV broadcasting and are exacerbated in high power HDTV broadcasting. Those problems include:
- Stabilizing the impedance,
- Reducing intercarrier distortion [and],
- Reducing inter-mode products generated in the klystron,
- Eliminating ghosts.

As discussed above, small impedance changes can result in large changes in power output of the UHF klystrons. A high power isolator like circulator 50 provides a constant impedance to the RF generator with isolation levels of 30 dB or greater. It also protects the klystrons from even the largest of impedance changes, including catastrophic change due to short circuits and lightning hits. The isolation is sufficiently high to stabilize varying impedances and reduce inter-carrier phase distortion. Reflection from the antenna (ghosts) are totally absorbed by non-reflective load 47 that is coupled to the third port of the circulator.

Circulator 50 in the embodiment shown in FIG. 1 absorbs other frequencies flowing from antenna line 46 that may be from the antenna or from other sources. In prior systems, these frequencies would be coupled back into the klystron creating intermode products therein which would then be transmitted along with the main signal.

In FIG. 1, circulator 50 functions as a "hot switch". Conventionally, the output switch on all transmitters is either a patch panel or a motorized switch. In either case the transmitter must be shut down before switching can take place and that requires the use of remote controls and various answer back commands to insure that the motorized switch has been fully engaged before transmitter power can be reapplied. With the addition of remotely controlled power tuner 51 on the output of circulator 50, the RF power can be switched from antenna transmission line 46 to station load 52 without shutting down the transmitter. Power tuner 51 is controlled by motor 53. Power tuner 51 could also be a power switch driven by motor 53 to switch the circulator output from the antenna to the station load.

If non-reflecting load 47 terminates port 73, RF power from diplexer port 34 enters port 71 and comes out at port 72 going to the antenna 45, via power tuner 51. Reflections from the antenna enter port 72 and are absorbed by load 47. Thus, the RF generator looking out of diplexer 30 always sees a perfect match at port 71 independent of the impedance of whatever is coupled to port 72. Because the load is matched, there are no reflections that come back to the diplexer; all reflections go to the matched (non-reflecting) load 47. Also, the antenna sees a perfectly matched generator at port 72, even if the internal impedance of the generator is not matched, since the generator and antenna are isolated.

The basic principle of operation of circulator 50 involves the deflection of an RF plane wave by a premagnetized ferrite cylindrical body or bodies in the Y-junction. The ferrite cylinder is magnetized perpendicular to the plane of the waveguide. The wavefront of an incoming RF wave at port 71 is deflected and goes out at port 72. In the past, circulators have been used for low and medium power applications up to a few kilowatts. The main problem in high power applications is the removal of the heat dissipated inside the ferrite cylinder. This has required the development of a new ferrite material that had very low loss. The low loss permits the use of more efficient and smaller cooling techniques. The new low loss ferrites have an insertion loss of 0.03 dB. To remove the heat, the ferrite cylinder is divided into several thin ferrite discs which are bonded in pairs to thin water cooled metal carrier plates. High power circulators of this kind are described in U.S. Pat. No. 4,717,895, entitled: High Frequency, High Power Waveguide Junction Circulator, which issued Jan. 5, 1988 to Erich Pivit, et al. The same Erich Pivit is an inventor in the present application.

The power handling capabilities of the circulator depends on the transmission line as well as the ferrite material and cooling techniques. A typical circulator of this type has a ferrite loss of 0.03 dB. For the 120 kW TV transmitter system, the ferrite losses are about 500 watts that has to be removed. U.S. Pat. No. 4,717,895 describes a structure and system for removing this heat power by circulating water through the ferrite metal carrier plates.

Figure 6:
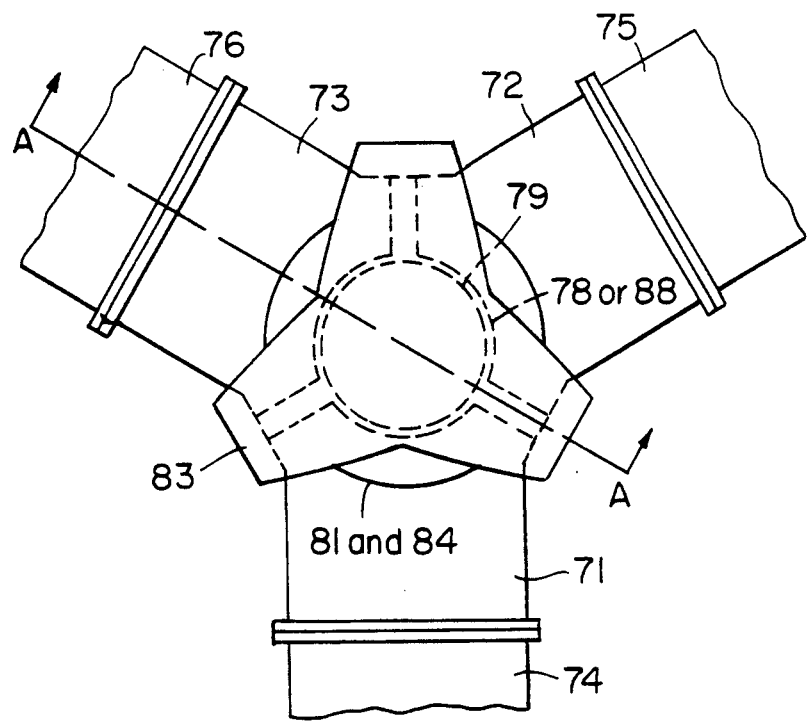
FIG. 6 is a plan view of a high power waveguide Y-junction temperature stabilized circulator suitable for use in the system in FIG. 1.
Figure 7:
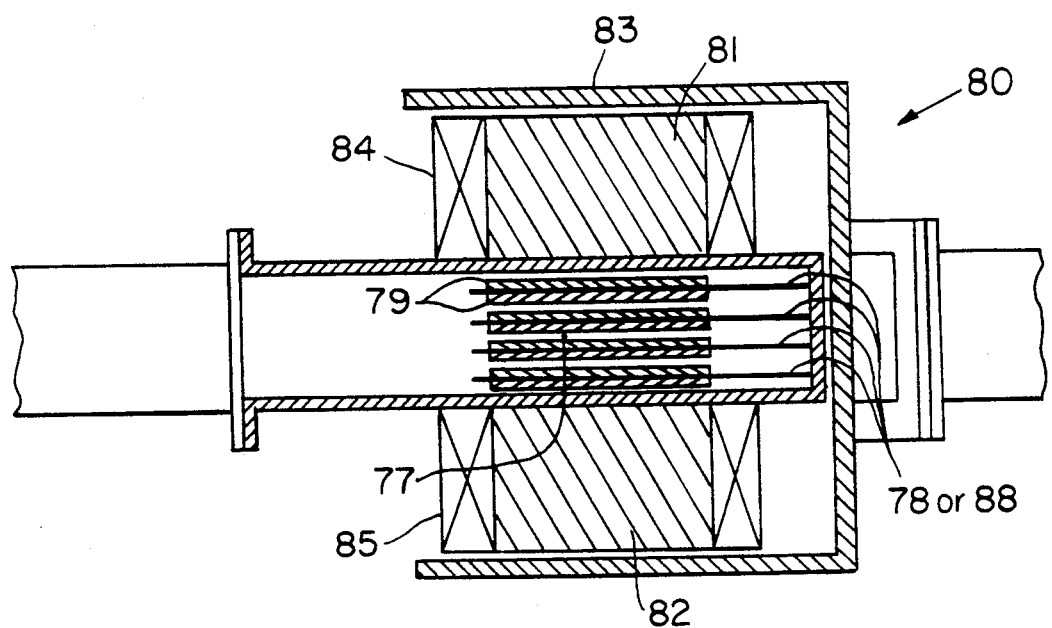
FIG. 7 is a longitudinal sectional view along line A—A of the waveguide Y-junction circulator of FIG. 6.

The circulator shown in FIG. 6 and 7 and the techniques described herein for maintaining the ferrite temperature constant over a wide range of ambient and power operating conditions is also described in U.S. Pat. Ser. No. 5,128,635 entitlted "High Power Ferrite Circulator" by Erich Pivit and Thomas J. Vaughn, issued Jul. 7, 1992. The techniques described in that patent and also described herein can be applied to provide circulators for carrying 300 kW, or more, at frequencies of 50 MHz and above.

As shown in FIG. 6, the high power waveguide Y-junction of the circulator has three junction arms 71, 72 and 73 mutually offset from one another by 120° and connected with connecting transmission line waveguides 74, 75 and 76, respectively. The internal structure and arrangement of the magnet system of the circulator is shown in FIG. 7 which is a sectional view of FIG. 6 along line A—A which passes through the longitudinal axis of junction arm 73.

The ferrite magnetization is furnished by a magnet system that includes a permanent magnet 80 having magnet cores 81 and 82 above and below the junction and flux return 82. Each core is surrounded by an electric coil 84 and 85. A function of the coils is to vary the magnetic field strength through the ferrite material.

Inside the Y-junction, in space 77 from which arms 71, 72 and 73 branch out, are one to four spaced thin metal plates 78, arranged one above the other. These metal plates 78 serve as carriers for ferrite discs 79 attached to the upper and undersides of each plate. The ferrite material which produces the nonreciprical effect of a circulator is divided into the plurality of thin discs 79 to maintain at a minimum the temperature gradient produced in the ferrite material by the high operating power. The division of the ferrite material into a plurality of thin discs has the result that the "effective filling factor", which is the ratio of the sum of the thicknesses of all ferrite discs to the total height or space 77 (also the height of the waveguide arms) may be less than in conventional waveguide circulators operated at lower power. Since "filling factor" and band width are proportional to one another, the realizable band width for extremely high power circulators is generally less than for small signal circulators.

To dissipate the heat produced in the ferrite discs, metal plates 78 may be provided with passages through which a fluid coolant flows as described in said U.S Pat. Nos. 4,717,895 and 5,128,635. Maintaining the ferrite temperature constant over a wide range of ambient and power operating conditions is accomplished preferably by heating as well as cooling the metal plates as described in said U.S. Pat. No. 5,128,635.

Figure 8:
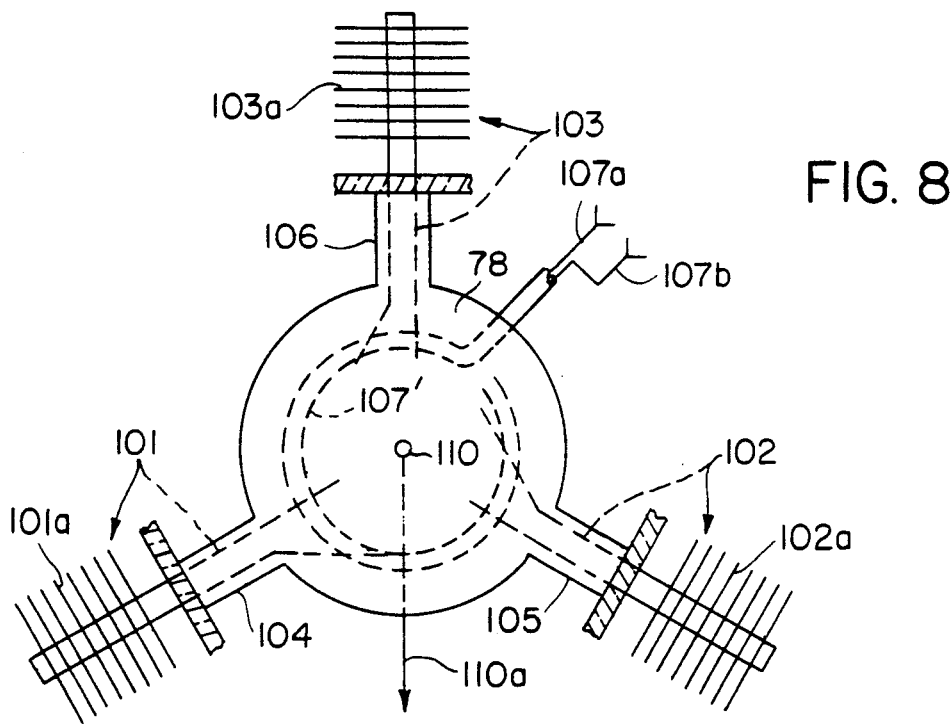
FIG. 8 is a plan view of an embodiment of the high power temperature stabilized circulator showing the metal plate for carrying the ferrite material in the junction and showing parts of a heat pipe cooling system, an electric heating system and a ferrite temperature detection and control system.
Figure 9:
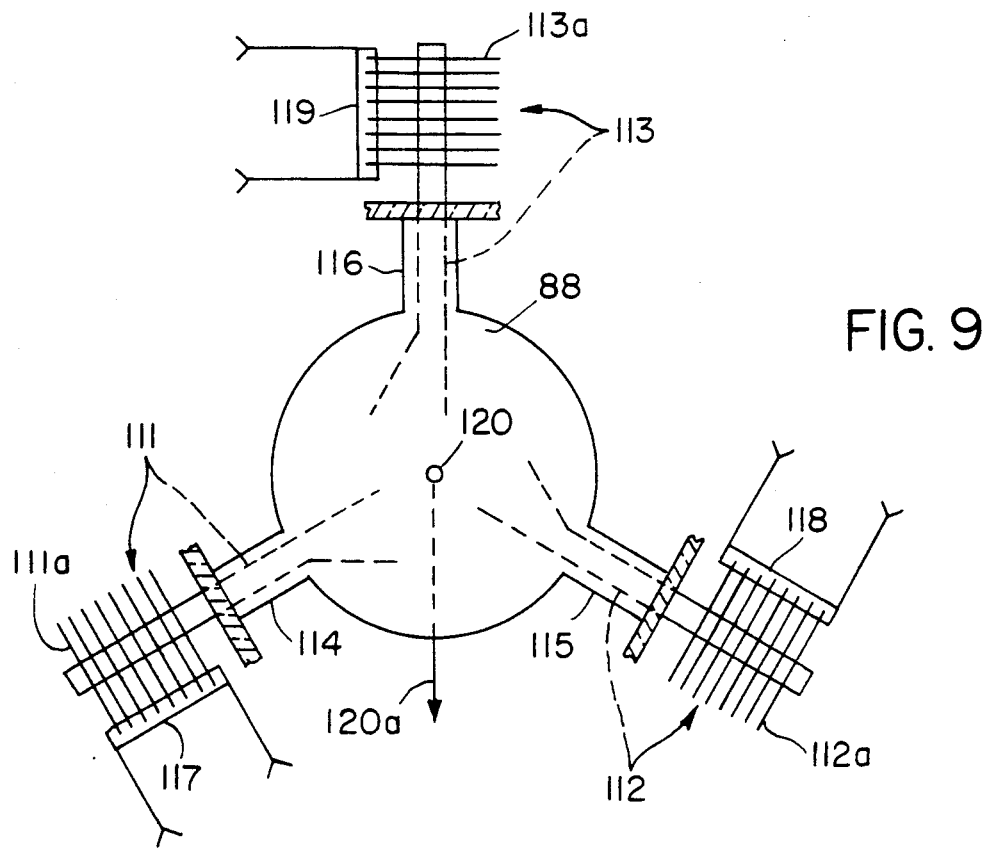
FIG. 9 is a plan view of another embodiment of the circulator showing the metal plate for carrying the ferrite material in the junction and showing parts of a heat pipe cooling and heating system and a heat pipe heat exchanger for operation to cool or to heat the ferrite material and a ferrite temperature detection and control system.

Turning next to FIG. 8 and 9 there are shown several techniques of cooling and heating a metal plate that carries the ferrite discs using heat pipes. These techniques are also described in said U.S. Pat. No. 5,128,635. In FIG. 8, plate 78 has three support projections 104 to 106 for attaching the plate to the inside walls of the junction and serving also to carry heat pipes 101, 102, and 103. These heat pipes contain suitable heat exchanging materials sealed therein so that the heat exchanging materials flow inside of the plate. The heat pipes extend through the side walls of the junction to one or more heat exchanges on the outside of the junction. For example, the heat pipes 101 to 103 connect thermally to heat exchangers 101a to 103a, respectively. In this embodiment, the heat pipes serve only to cool the plate by conducting heat therefrom and discharging the heat into the ambient air via the finned heat exchangers.

Plate 78 in FIG. 8 is heated by a circular heating element 107 that may feed into the plate from the side through a side wall of the junction. Electric leads for the element are denoted 107a and 107b. A temperature detector 110 may be located at the center of the plate and a signal therefrom in line 110a is fed to control circuits of the control system shown in FIG. 10.

Turning next to FIG. 9, there is shown another embodiment of the present invention wherein the plate 88 is both cooled and heated via one or more heat pipes. Here, the plate 80 is mounted inside the junction by projections 114 to and the heat pipes 111 to 113 are carried inside the plate via projections 114 to 116, respectively. In the cooling mode, the heat exchanging materials inside the heat pipes carry heat from the plate to cooling fins attached to the heat pipe. For example, heat pipe 111 has fins 111a attached thereto outside of the junction where ambient air flows around the fins and carries the heat into the atmosphere, just as also in the embodiment shown in FIG. 8.

In the heating mode, the same heat pipes carry heat to plate 88 to raise the temperature of the plate. For the heating mode, it is not always sufficient to rely upon the ambient air temperature to supply heat to the fins to be carried to the plate; it is necessary to heat the fins using a source that is hotter than ambient air. For that purpose, electric heating elements 117 to 119 may be attached to fins 111a to 113a, respectively. The temperature of the plate is detected by detector 120 and a signal represented thereof is coupled via lead 120a to the control circuits of the system shown in FIG. 11.

The waveguide Y-junction circulator shown in FIGS. 6 and 7 and described herein and also the circulators described in the above mentioned U.S. Pat. Nos. 4,717,895 and 5,128,635 can be loaded with a plurality of cooling plates spaced apart as shown in FIG. 7 and each carrying two layers of ferrite material. Using several thin plates such as the plates described herein each carrying two layers of ferrite material, one on each side, the effective "filling factor" can be made relatively large, because the waveguide circulator permits this stacking.

Figure 10:
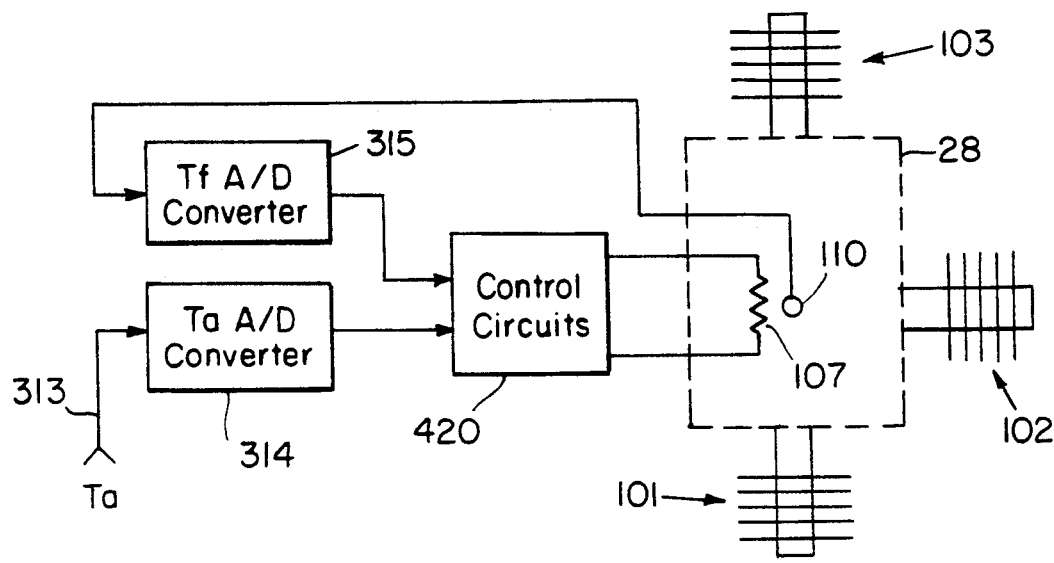
FIG. 10 is a schematic block diagram of a control system for use with the circulator having plates such as shown in FIG. 8.

Cooling the plate 78 with heat pipes as illustrated in FIG. 8 may be controlled by a system such as shown in FIG. 10. In this system, inputs to the control circuits 420 are ferrite temperature, Tf, and ambient temperature, Ta. An output of control circuits controls electric current to heating element 107. In FIG. 9, cooling plate 88 occurs without control via heat pipes 111 to 113 that dump the heat into ambient air flow. The efficiency of this cooling depends upon the ambient temperature and for that reason Ta is an input to control circuits 420.

Figure 11:
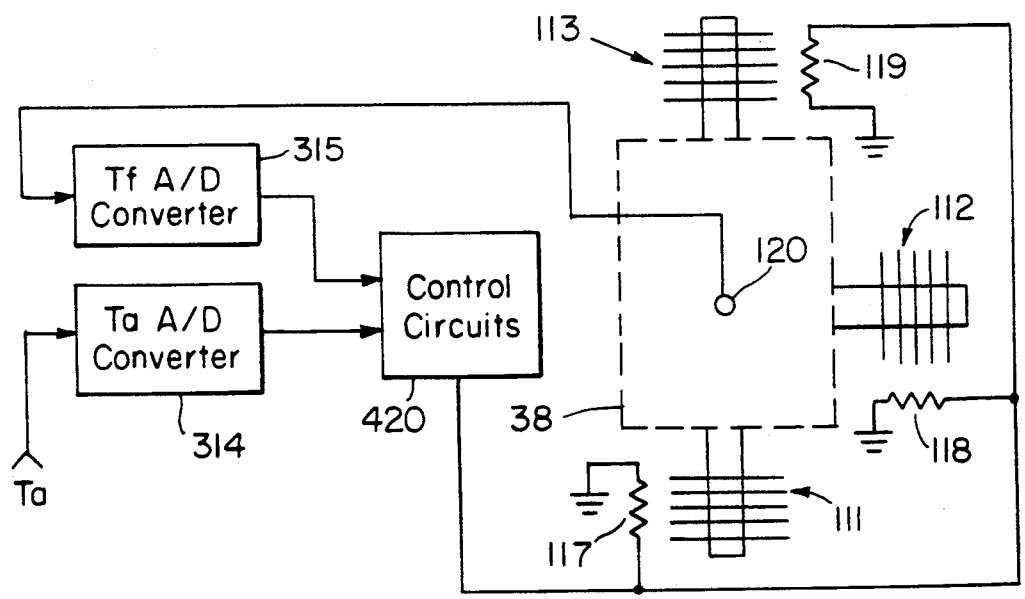
FIG. 11 is a schematic block diagram of a control system for use with the circulator having plates such as shown in FIG. 9.
Figure 12:
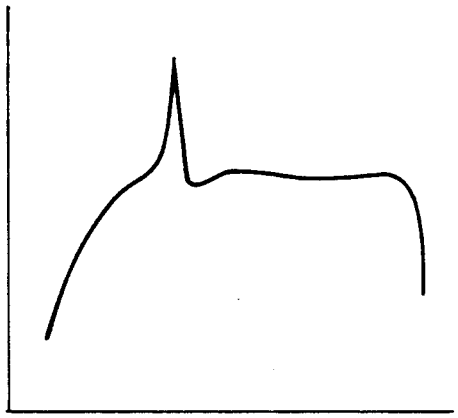
FIG. 12 and 13 represent prior art scope traces that illustrate certain responses described hereinabove.
Figure 13:
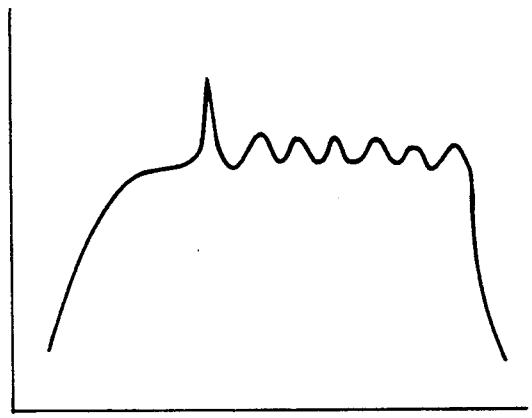

Cooling and heating the plate 88 by heat pipes as illustrated in FIG. 9 may be accomplished using the control systems shown in FIG. 11. Here, as in FIG. 10, there are two inputs to control circuits 420, Tf and Ta, and cooling is accomplished only via heat pipes 111 to 113. However, heating is also accomplished via those heat pipes and there may not be a need for an electric resistance heating element imbedded in the plate. Here, the control circuits 420 control heating current flow to heating elements 117 to 119 that feed heat into heat tubes 111 to 113, respectively, via their cooling fins. An advantage of this system is that plate 88 need not be implemented with embedded coolant flow passages and embedded electric heating elements.

It will be understood that the high power broadcast TV or HDTV system described herein with a high power circulator constructed and operated as described may be modified by those skilled in the art without deviating from the spirit and scope of the invention as set forth in the appended claims.

What is claimed is:

1. A television broadcast transmission system including a broadcast antenna and antenna transmission line feeding television RF broadcast signals to said antenna, comprising, (a) a source of said television RF broadcast signals and an output transmission line for said source, (b) a ferrite circulator including a junction containing magnetized ferrite material, said junction having first, second and third RF signal ports of which: RF signal flow into said first port couples readily to said second port but not to said third port, RF signal flow into said second port couples readily to said third port but not to said first port and RF signal flow into said third port couples readily to said first port but not to said second port, (c) said source output transmission line is coupled to said circulator first port, (d) a non-reflecting RF load is coupled to said circulator third port, (e) said television broadcast antenna transmission line is coupled to said circulator second port and (f) means are provided for tuning said circulator including means for cooling and heating said circulator ferrite material, (g) whereby said source output transmission line is isolated from reflections from said antenna transmission line.

2. A system as in claim 1 wherein, (a) said ferrite material is magnetized by a magnet system outside of said junction, (b) said ferrite material is resonant to electromagnetic waves at the frequency of said television RF broadcast signals when said ferrite material is at a predetermined temperature and (c) said means for tuning said ferrite material maintains the temperature of said ferrite material near said predetermined temperature.

3. A system as in claim 2 wherein, (a) said means for tuning includes means thermally coupled to said ferrite material and thermally coupled to a source of relatively constant temperature, (b) whereby said ferrite material temperature is maintained near said predetermined temperature.

4. A system as in claim 1 wherein, (a) said source television RF broadcast signals define a first television broadcast channel, (b) a second source of television RF broadcast signals is provided that define a second television broadcast channel and (c) a diplexer is provided for combining said first and second television RF broadcast signals in said source output transmission line, (d) whereby said first and second television RF broadcast channel signals are fed to said broadcast antenna.

5. A system as in claim 1 wherein, (a) said source includes two power klystrons and switchless combiner circuit, (b) whereby the RF power of both of said klystrons is fed to said source output transmission line.

6. A system as in claim 5 wherein, (a) said ferrite material is magnetized by a magnet system outside of said junction, (b) said ferrite material is resonant to electromagnetic waves at the frequency of said television RF broadcast signals when said ferrite material is at a predetermined temperature and (c) said means for cooling and heating said ferrite material maintains the temperature of said ferrite material near said predetermined temperature.

7. A system as in claim 6 wherein, (a) said means for tuning includes means thermally coupled to said ferrite material and thermally coupled to a source of relatively constant temperature, (b) whereby said ferrite material temperature is maintained near said predetermined temperature.

8. An RF broadcast signal transmission system including a broadcast antenna and antenna transmission line feeding RF broadcast signals to said antenna, comprising, (a) a source of said RF broadcast signals and an output transmission line for said source, (b) a ferrite circulator including a junction containing magnetized ferrite material, said junction having first, second and third RF signal ports of which: RF signal flow into said first port couples readily to said second port but not to said third port, RF signal flow into said second port couples readily to said third port but not to said first port and RF signal flow into said third port couples readily to said first port but not to said second port, (c) said source output transmission line is coupled to said circulator first port, (d) a non-reflecting RF load is coupled to said circulator third port, (e) an RF station load and (f) means coupled to said circulator second port for selectively coupling said antenna transmission line or said RF station load to said second port, (g) whereby said source output transmission line is isolated from said antenna transmission line and said station load.

9. A system as in claim 8 wherein, (a) said source RF broadcast signals define a first broadcast channel, (b) a second source of RF broadcast signals is provided that define a second broadcast channel and (c) a diplexer is provided for combining said first and second RF broadcast signals in said source output transmission line, (d) whereby said first and second RF broadcast channel signals are fed to said broadcast antenna.

10. A system as in claim 8 wherein, (a) said source includes two power klystrons and a switchless combiner circuit, (b) whereby the RF power of both of said klystrons is fed to said source output transmission line.

11. A television broadcast transmission system including a broadcast antenna and antenna transmission line feeding television RF broadcast signals to said antenna, comprising, (a) a source of said television RF broadcast signals and an output transmission line for said source, (b) a ferrite circulator including a junction containing one or more bodies of magnetized ferrite material in the path of electromagnetic waves of said television RF broadcast signals entering said junction, said ferrite material having non-reciprocal electromagnetic wave propagating characteristics at a gyromagnetic resonance frequency thereof, (c) said gyromagnetic resonance frequency, the frequency of said television RF broadcast signals from said source and the orientation of said ferrite bodies being such that said television RF broadcast signals are conducted non-reciprocally through said circulator junction from said source output transmission line to said antenna transmission line, (d) said junction having first, second and third RF signal ports of which: RF signal flow into said first port couples readily to said second port but not to said third port, RF signal flow into said second port couples readily to said third port but not to said first port and RF signal flow into said third port couples readily to said first port but not to said second port, (e) said source output transmission line is coupled to said circulator first port, (f) a non-reflecting RF load is coupled to said circulator third port, (g) said television RF broadcast antenna transmission line is coupled to said circulator second port and (h) means are provided for tuning said circulator including means connected to said bodies of ferrite material for cooling and for heating said bodies to maintain said bodies within a predetermined temperature range.

12. A system as in claim 11 wherein, (a) said means connected to said one or more bodies of ferrite material maintains the temperature of said bodies within a predetermined temperature range while the power of said high frequency electric wave signals conducted through said structure varies over a power range.

13. A system as in claim 11 wherein, (a) said means connected to said one or more bodies of ferrite material includes a heat sink and a thermal conductor for thermally coupling one or more of said ferrite bodies to said heat sink, (b) whereby said bodies are cooled by the flow of heat therefrom to said heat sink.

14. A system as in claim 11 wherein, (a) said means connected to said one or more bodies of ferrite material includes a source of heat energy and means for coupling heat energy from said source of heat energy to said bodies of ferrite material, (b) whereby said bodies are heated by energy from said source of heat energy.

15. A system as in claim 13 wherein, (a) said thermal conductor includes a thermally conductive body in said structure in intimate thermal contact with one or more of said bodies of ferrite material and (b) means for thermally coupling heat from said thermally conductive body to said heat sink.

16. A system as in claim 13 wherein, (a) said thermal conductor includes a thermally conductive body in said structure in intimate thermal contact with one or more of said bodies of ferrite material and (b) means for thermally coupling heat from said thermally conductive body to said heat sink, (c) said thermally conductive body has orthogonal major and minor dimensions and said minor dimension is parallel to the electric field of said high frequency wave signals from said input transmission line propagating in said structure, (d) said thermally conductive body and said means for thermally coupling heat therefrom to said heat sink contains fluid transport passages for cooling fluid that carries heat from said ferrite bodies to said heat sink and (d) said means connected to said bodies of ferrite material includes a source of heat energy and means for coupling energy from said source of heat energy to said bodies of ferrite material, (f) whereby said bodies are heated by energy from said source of heat energy.

17. A system as in claim 16 wherein, (a) one or more heat pipes thermally coupled with said thermally conductive body lead cooled or heated air from or to a cooling or a heating device to or from said thermally conductive body, (b) whereby said air is cooled or heated to a temperature as required to maintain the temperature of said bodies of ferrite material within a predetermined temperature range.

* * * * *